United States Patent [19]

Lee et al.

[11] Patent Number: 4,626,853
[45] Date of Patent: Dec. 2, 1986

[54] PULSE COMPRESSION RADAR SIGNAL PROCESSOR

[75] Inventors: Henry E. Lee, Columbia; Michael B. Seldes, Rockville, both of Md.

[73] Assignee: Westinghouse Electric Corp., Pittsburgh, Pa.

[21] Appl. No.: 632,979

[22] Filed: Jul. 20, 1984

[51] Int. Cl.[4] .......................... G01S 7/28; G01S 13/28
[52] U.S. Cl. .................................................. 342/132
[58] Field of Search ...................... 343/5 FT, 17.2 PC

[56] References Cited

U.S. PATENT DOCUMENTS 3,680,105  7/1972  Goldstone ................. 343/17.2 PC
3,889,199  6/1975  Gutleber .................. 343/17.2 PC X
3,987,285  10/1976 Perry ...................... 343/17.2 PC X
4,028,700  6/1977  Carey et al. ............... 343/17.2 PC Primary Examiner—T. H. Tubbesing
Assistant Examiner—Mark Hellner
Attorney, Agent, or Firm—W. E. Zitelli

[57] ABSTRACT

A pulse compression signal processor suitable for use in a phase-coded, pulse compression radar for decoding the phase coded radar return pulses to enhance the resolvability of objects in range is disclosed. The pulse compression signal processor includes a conventional correlation processor operative in accordance with an initial filter function to convert a signal representative of the phase-code of the transmittal RF pulse to effect the range correlation response thereof. The resulting range correlation response is modified in accordance with a desired range correlation response. Both the phase code representative signal and the desired range correlation response signal are converted by fast Fourier transformations into their corresponding frequency domain signals which are divided to effect a desired filter function signal for use in decoding the phase-coded radar return pulses to effect substantially the desired range correlation response thereof. The pulse compression signal processor further includes an interative process to truncate the desired filter function signal in time in accordance with pre-established criteria.

10 Claims, 9 Drawing Figures

PULSE COMPRESSION RADAR SIGNAL PROCESSOR

BACKGROUND OF THE INVENTION

The present invention relates to phase coded, pulse compression radars, and more particularly, to a pulse compression signal processor suitable for use therein for decoding the phase-coded radar return pulses to enhance the resolvability of objects in range.

Phase-coding and pulse compression are commonly used in radar systems to effect an increased average power in pulse transmission while maintaining a fine range resolving capability in processing the phase-coded radar return pulses. These techniques may be accomplished by transmitting a long phase-coded or phase-modulated pulse and by signal processing a return pulse, rendered from the transmission, to a relatively short pulse, commonly referred to as pulse compression.

The block diagram schematic embodiment depicted in FIG. 1 exemplifies a phase-coded, pulse compression radar. Typically, a stable local oscillator (STALO) 10 generates an RF signal 12 which may be gated at 14 using a signal 16 representative of a predetermined pulse width to form a substantially pulsed RF signal 17. A phase modulator 18 may be used to code the RF of the pulse in accordance with a phase code signal 20 which may be generated by a phase code generator 22. The phase-coded pulsed RF signal governs the operation of a conventional transmitter 24 for transmission of the pulse into space via circulator 26 and antenna system 28. A return radar pulse is received by the antenna system 28 and conducted to a conventional receiving section 30 via circulator 26. The receiver section 30 conditions the phase-coded RF return pulse conventionally using a plurality of mixer stages 32, which may be governed by various local oscillator signals LO and corresponding amplifier and low-pass filter (LPF) stages 34.

In most modern radars, processing of the conditioned radar return signal is performed in a digital signal processor depicted at 36, for example, in which case the return phase-coded pulse signal is digitized first in an analog-to-digital (A/D) converter 38. Pulse compression of the radar return pulse may be accomplished by a phase decoding function 40 programmed into the digital signal processor 36. The phase-decoding function 40 utilizes a phase-coded signal 42 provided to the processor 36 from the phase-coded generator 22, for example, to pulse compress the digitized conditioned return pulse denoted by the arrow 44 to effect a signal 46 representative of the range correlation response thereof.

Not only does the phase decoding function 40 provide a response at the range of the object, it also generates, at times, responses of troublesome levels at ranges on either side thereof, more commonly referred to as range sidelobes. It has been generally an object in the design of phase decoding filters of this type to suppress the range sidelobes in the range correlation response. Some recent advances towards meeting this objective include a phase decoding filter design using least square methods which provide optimal performance in terms of the integrated sidelobe level. The least square method type filters have also been found to have very low signal-to-noise (S/N) loss. For a better understanding of least square method filters, reference is made to the paper: M. H. Ackroyd and F. Ghani, "Optimum Mismatched Filters for Sidelobe Suppression," IEEE Transactions on Aerospace and Electronic Systems, Vol. AES-9, No. 2, Mar. 1973. One shortcoming of the least square method type filter is that the range correlation response usually contains a number of high peak range sidelobes since the peak sidelobe level is not explicitly minimized by the least square solution. As a result, these resulting high peak range sidelobes may give rise to false signals at ranges other than the range of the object of interest.

Another technique for suppressing the range sidelobes in the phase-coded pulse return signals, known as linear programming, was used to compute the weights of a phase decoding filter for minimizing the peak range sidelobes of the range correlation response. For a more detailed description of a linear programming technique, reference is made to the paper: S. Zoraster, "Minimum Peak Range Sidelobe Filters for Binary Phase Coded Waveforms," IEEE transactions on Aerospace and Electronic Systems, Vol. AES-16, No. 1, January 1980. This technique, however, is limited to binary phase codes only. In addition, the mathematical structure of the linear programming technique is such that it has at least as many inequality constraints which are exactly satisfied by the optimal solution as there are variables in the problem. This drawback results in increased integrated sidelobe level and S/N loss.

Apparently, what is desirable in pulse compression processing is to have a phase decoding filter which provides not only low integrated sidelobe level and low S/N loss, but also minimizes the peak sidelobe level. It would be therefore, beneficial to have a filter which did not suffer from a rigid mathematical structure in its optimization procedure, but rather permit a desired flexibility in the effectuation of the range correlation response of a phase-coded pulse return signal. Still further, the phase decoding filter should not be limited to solely binary phase-coded RF pulsed waveforms, but rather be additionally applicable to the polyphase codes of the more sophisticated modern radars.

SUMMARY OF THE INVENTION

A phase-coded, pulse compression radar includes a first means for transmitting phase-coded RF pulses, a second means for receiving and conditioning the phase-coded radar return pulses rendered from the transmission, and a pulse compression signal processor for decoding the phase-coded radar return pulses from the second means to enhance the resolvability of objects in range. In accordance with the present invention, the pulse compression signal processor comprises a first filter means responsive to a first signal representative of the phase-code of the transmittal RF pulse to effect a second signal representative of the range correlation response of the first signal, means for modifying the second signal into a third signal representative of a desired range correlation response, means governed by the first signal and the third signal to generate a fourth signal representative of a desired filter function, and a second filter means for phase decoding the phase-coded radar return pulse from the second means as a function of the fourth signal to effect substantially the desired range correlation response therof.

More specifically, the fourth signal generating means includes means for transforming the first and third signals into their respectively corresponding frequency domain signals, and means for dividing the frequency domain transform of the third signal by the frequency domain transform of the first signal to generate the frequency domain transform of the fourth signal. The second filter means includes a means for multiplying a signal representative of the frequency domain transform of the phase-coded radar return pulse with the frequency domain transform of the fourth signal to effect substantially the frequency domain transform of the desired range correlation response of the phase-coded radar return pulse.

The pulse compression signal processor further includes means for truncating the length of the time of the fourth signal, thereby effecting a truncated desired filter function signal, means for phase-decoding the first signal as a function of the truncated fourth signal to effect a range correlation response of the first signal, means for providing the truncated fourth signal to the second filtering means if the range correlation response of the first signal satisfies pre-established criteria, and means for causing the range correlation response of the first signal to satisfy the pre-established criteria by adjusting the truncation of the fourth signal.

DESCRIPTION OF THE PREFERRED EMBODIMENT

Figure 2:
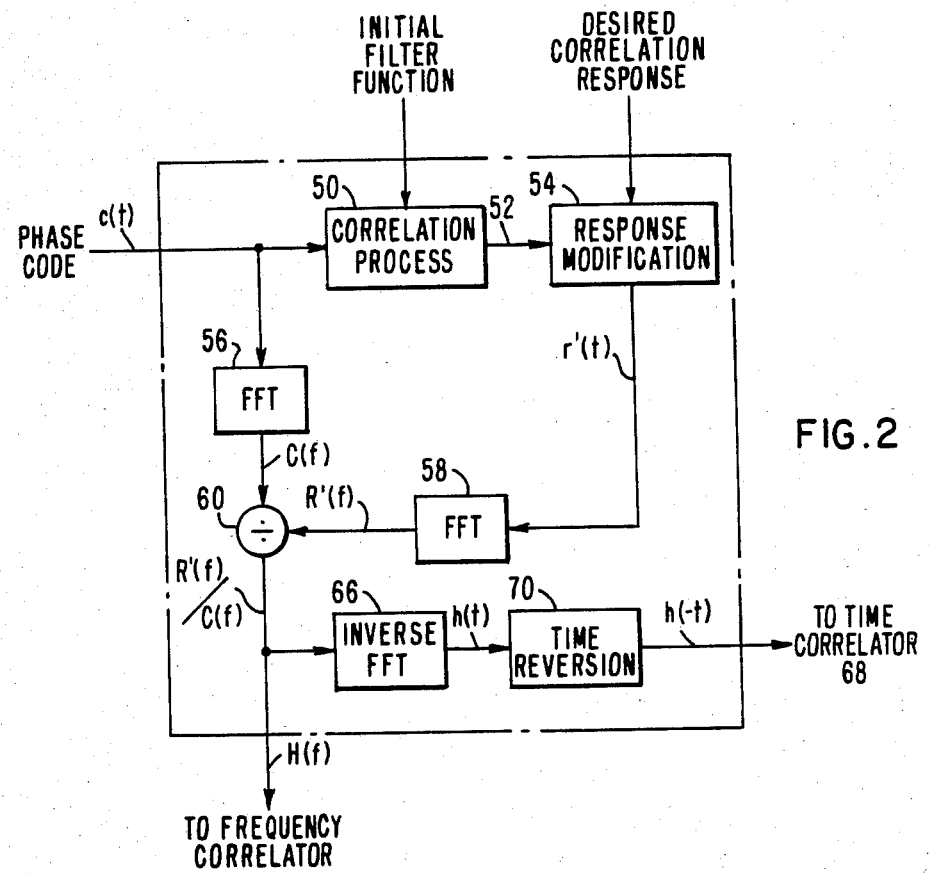
FIG. 2 is a functional block diagram schematic of a portion of a pulse compression signal processor suitable for embodying the principles of the present invention.

Depicted in FIG. 2 is a functional block diagram schematic embodiment of a portion of a pulse compression signal processor suitable for use in a digital signal processor for the processing of radar signals. The embodiment of FIG. 2 is operative to generate a desired filter function signal for the phase decoding processor 40 for use in the pulse compression operations thereof.

More specifically, a signal, denoted as c(t), representative of the phase-code of the transmitted RF pulse may be provided to a correlator functional block 50. The correlation process performed in the function 50 may include a correlation filter operative with an initial filter function. The correlation process of 50 may be a least square or minimum peak sidelobe filter, as described hereabove in the background section, or simply a conventional matched filter function. The resulting signal 52 which is representative of the range correlation response of the signal c(t) may be provided to a response modification functional block 54 in which the range correlation response of signal 52 may be modified in accordance with a desired range correlation response. The resulting desired range correlation response signal is denoted as r'(t).

The signals c(t) and r'(t) may be transformed into their respective frequency domain signals C(f) and R'(f), preferably using Fast Fourier Transform (FFT) signal processing techniques as depicted by the blocks 56 and 58, respectively. The frequency domain signal R'(f) may be divided by the frequency domain signal C(f) by the divider function 60 to generate a frequency domain transform signal for use in the pulse compression process of the radar return pulse.

Theoretically the signal output of the division operation 60 is the Discrete Fourier Transform (DFT) of the filter impulse response. This result is derived from the recognition that the convolution in time domain corresponds to a multiplication in he frequency domain, so that mathematically:

$$R'(f)=DFT\{r'(t)\}=DFT\{c(t)*h(t)\}=C(f)\ H(f), \quad (1)$$

where R'(f), C(f) and H(f) are the DFT or FFT of the de sired correlation response r'(t), transmit phase code c(t), and filter impulse response h(t), respectively. The symbol * denotes a convolution operation. Thus, from the above relationship, it follows that:

$$H(f)=R'(f)/C(f). \quad (2)$$

Figure 2A:
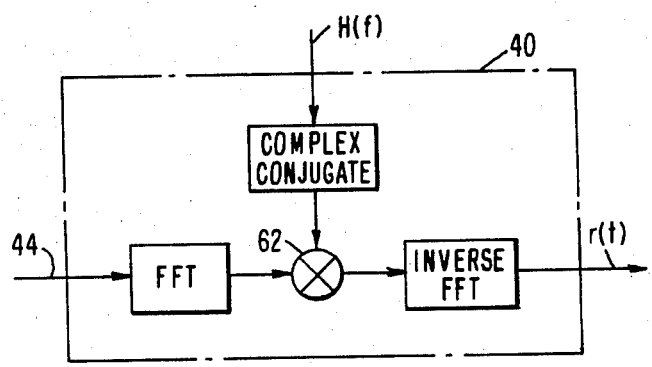
FIG. 2A is a block diagram schematic of a phase-decoding filter function suitable for use in the embodiment of FIG. 1.

In one embodiment, the DFT of the desired filter impulse response H(f) may be applied directly to a frequency-domain phase decoding filter 40 such as that depict ed in the diagram of FIG. 2A by multiplying the complex conjugate of it in a conventional multiplying function 62 by the DFT or FFT of the phase-coded radar return pulse signal 44. The time domain signal r(t) representative of the desired range correlation response may be generated by simply transforming the product output of the multiplication function 62, which includes the desired correlation properties, into its corresponding time domain signal using an inverse FFT, for example.

Figure 2B:
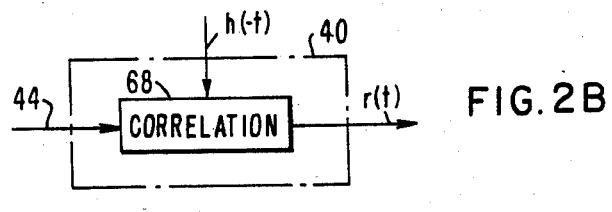
FIG. 2B is a functional block diagram of an alternate phase-decoding filter function suitable for use in the embodiment of FIG. 1.

In another embodiment, the time domain signal h(t) of the desired filter function may be obtained by taking the inverse FFT of the signal H(f) in the functional block 66. Furthermore, it is recognized that the cross-correlation of two time functions is equivalent to the convolution of the same two time function with one function reversed in time. Thus, if the phase decoding filter performs the filter function as a cross-correlation such as that depicted in the block diagram of the FIG. 2B, then it is desirable to facilitate a time reversion of the desired filter function signal h(t) to obtain the signal h(−t) for use in the correlation function 68 of the phase decoder 40 in accordance with the present embodiment. Time reversing the results h(t) of the inverse FFT 66 in a time reversion function block 70 accomplishes the desired result h(−t).

With regard to the phase decoding filter function of the embodiment described in connection with FIG. 2A, it is recognized that the frequency-domain decoding operation is a circular correlation where the phase-coded radar return pulse and the filter impluse response are assumed to be periodic functions. Consequently, in order to prevent any wrap around effect which may be caused by the circular correlation, the FFT size may be made sufficiently large. In addition, the S/N performance may be degraded somewhat as a result of modifying the initial range correlation response 52 in the response modification functional block 54. To minimize this effect, it is advisable to make only minor modifications to the correlation function 52 which may be accomplished by selecting phase codes with good autocorrelation properties and an initial correlation filter function which provides good cross-correlation response.

Moreover, it is desirable to keep the length of the time domain correlation filter function 68 relatively small especially when only minor modifications are being made to the initial range correlation response in the response modification functional block 54. However, keeping the time domain filter function relatively small seems contrary to permitting the FFT size to be made sufficiently large because the former is derived from the latter. But, this may be accomplished by truncating the desired time domain filter function signal h(−t) by gradually descreasing the length thereof in an iterative process until a minimum value is reached and the desired range correlation response r(t) effected thereby satisfies certain pre-established criteria like, having acceptable spurious sidelobes, for example.

Figure 1:
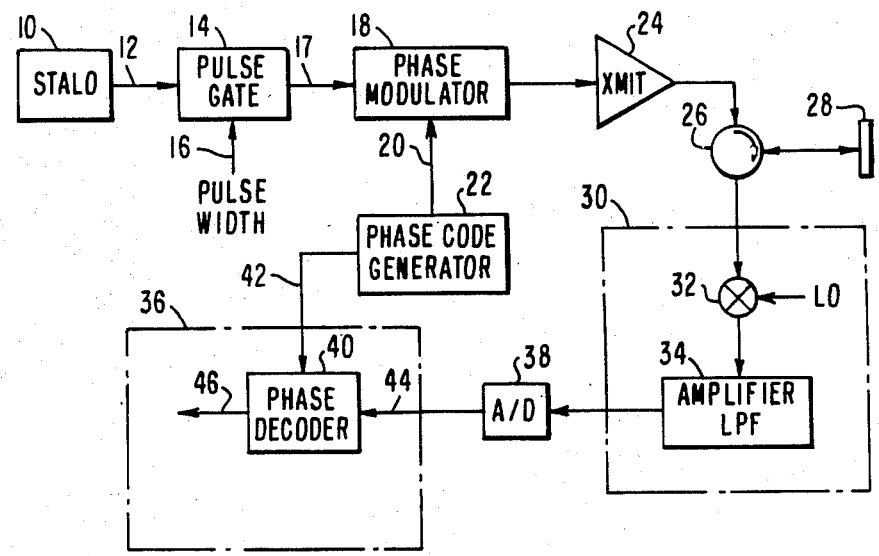
FIG. 1 is a block diagram schematic embodiment exemplifying a phase-coded, pulse compression radar.
Figure 3:
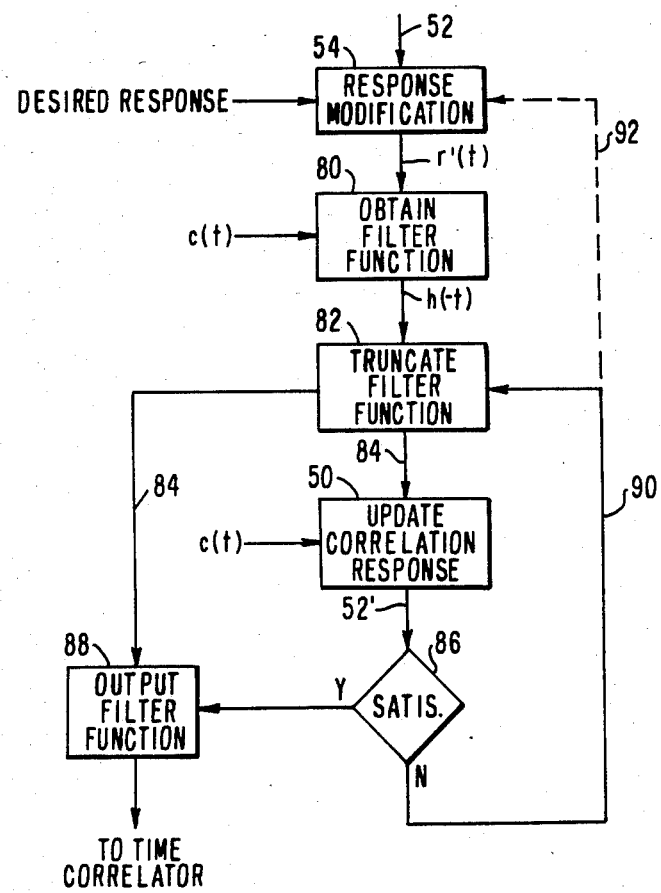
FIG. 3 is a functional block diagram schematic of an embodiment which permits an iterative process to adjust the truncation of the desired filter function signal to effect a satisfactory alternative to the desired range correlation response of the phase-coded radar return pulse.

In accordance with this aspect of the present invention, a block diagram schematic of an embodiment which permits an iterative process to adjust the truncation of the desired filter function signal h(−t) to effect a satisfactory alternative to the desired range correlation response r(t) of the phase-coded radar return pulse is depicted in FIG. 3. More specifically, the initial range correlation response 52 may be modified in the block 54 in accordance with a desired correlation response setting to effect the modified range correlation response r'(t). The time reversed filter impulse response function signal h(−t) may be obtained through the functions of the block 80 which comprises the functions of the blocks 56, 58, 60, 66, and 70 as previously described in connection with the embodiment of FIG. 2. The length of time of the impulse response h(−t) may be truncated in the functional block 82 to effect a truncated filter function signal 84 which may become the filter function of the correlation process 50 to update the correlation response to effect a new range correlation response denoted as 52'. If the range correlation response represented by signal 52' satisfies the pre-established criteria as determined in the functional block 86, the signal 84 representative of the truncated signal h(−t) is provided to the correlation function 68 in the phase decoding filter 40 via gate 88. An unsatisfactory result of decisional block 86 causes an adjustment of the truncation of the filter function h(−t) via the control line 90. The adjustment of the truncation is in a direction to cause the range correlation response resulting therefrom to satisfy the pre-established criteria of the decisional block 86.

More specifically, the filter function signal h(−t) may be truncated in small increments, for example, until the range correlation response signal 52' resulting therefrom produces an unsatisfactory condition in the decisional block 86 wherein the previous truncated filter function signal was satisfactory. Accordingly, the previous setting of truncation is that minimum value to produce a satisfactory range correlation response signal 52'. Consequently, the filter function signal h(−t) may be truncated to that extent and provided to the correlation filter 68 via gate 88 for use as the correlation filter function in phase decoding the radar return pulse.

In an alternate embodiment, a fixed truncation setting may be established for truncating the filter function h(−t). Under this condition, an unsatisfactory condition determined by the block 86 may cause an alteration of the response modification of the range correlation response signal 52 via signal line denoted by the dashed line 92. Accordingly, the response modification may be incrementally altered until the pre-established criteria of block 86 are satisfied in which case the truncated filter function corresponding to the altered response modification is provided to the phase decoding filter 68 to effect a signal representative of an alternative to the desired range correlation response.

In summary, the length of the filter function h(−t) may be constrained to a specific truncated value by preestablished criteria imposed on the range correlation response effected thereby. The response modification may be altered with a fixed truncation length imposed on the truncated filter function signal or the length of the filter function signal may be truncated incrementally for a fixed response modification. In either case, the operation includes a number of iterations until a satisfactory range correlation response 52' is reached. The final range correlation response effected by the truncated filter function signal represents a compromise between the desired correlation response and the specified filter function length or response modification attainable according to the pre-established criteria.

Figure 4:
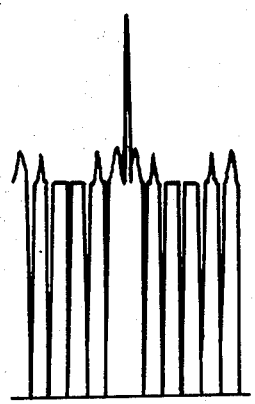
FIGS. 4, 5, 6, and 7 are graphs illustrating experimental results using a 36-element polyphase code (Frank code).
Figure 5:
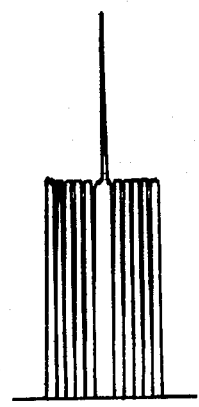
Figure 6:
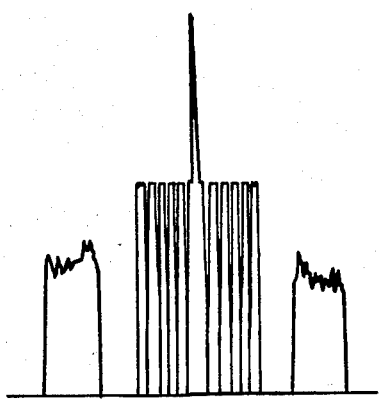
Figure 7:
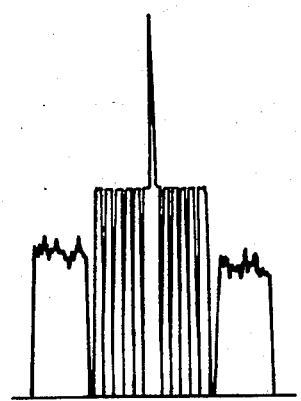

Experimental results using a 36-element polyphase code (Frank code) are illustrated in the graphs of FIGS. 4, 5, 6 and 7. Improved range sidelobe capability is shown in the correlation responses of FIGS. 5, 6 and 7. FIG. 4 depicts an autocorrelation response which has a peak sidelobe of −25.1 dB and integrated sidelobe of −11.1 dB. Using the response modification techniques described hereabove in connection with FIGS. 2 and 3, the autocorrelation response of FIG. 4 may be modified to the one shown in FIG. 5 by dividing any sidelobes that are greater than one by two. The response of FIG. 5 illustrates a 6 dB improvement in peak sidelobe to −31.1 dB and an improvement in integrated sidelobe to −13.4 dB with a resulting S/N loss of only 0.14 dB. With regard to the responses of FIGS. 6 and 7, the length of the filter function signal h(−t) was limited to 156 element and 116 elements, respectively. In each case, additional far sidelobes appear. However, the peak and integrated sidelobe values of the responses resulting from the truncation of the filter function signal are not much altered from the desired values resulting from an untruncated filter function signal. The S/N losses on the other hand are slightly improved to 0.13 and 0.11 dB for the filter function signal length of 156 and 116 elements, respectively.

We claim:

1. In a phase-coded, pulse compression radar including first means for transmitting phase-coded RF pulses, and second means for receiving and conditioning the phase-coded radar return pulses rendered from said transmission, a pulse compression signal processor for decoding said phase-coded radar return pulses from said second means to enhance the resolvability of objects in range, said pulse compression signal processor comprising:

first filter means responsive to a first signal representative of the phase-code of said transmittal RF pulse to effect a second signal representative of the range correlation response of said first signal;

means for modifying said second signal into a third signal representative of a desired range correlation response;

means governed by said first signal and said third signal to generate a fourth signal representative of a desired filter function; and second filter means for phase decoding said phase-coded radar return pulse from said second means as a function of said fourth signal to effect substantially said desired range correlation response thereof.

2. The pulse compression signal processor in accordance with claim 1 wherein the fourth signal generating means includes:

means for transforming the first and third signals into their respectively corresponding frequency domain signals; and means for dividing said frequency domain transform of the third signal by said frequency domain transform of the first signal to generate the frequency domain transform of the fourth signal.

3. The pulse compression signal processor in accordance with claim 2 wherein the second filter means includes a means for multiplying a signal representative of the frequency domain transform of the phase-coded radar return pulse with the frequency domain transform of the fourth signal to effect substantially the frequency domain transform of the desired range correlation response of the phase-coded radar return pulse.

4. The pulse compression signal processor in accordance with claim 2 wherein the transforming means comprises a fast fourier transform (FFT) signal processor.

5. The pulse compression signal processor in accordance with claim 2 wherein the fourth signal generating means includes another means for transforming the frequency domain transform of the fourth signal into its corresponding time domain signal; and means for performing a timer reversal of said time domain fourth signal to effect a fifth signal representative thereof; and wherein the second filter means includes means for performing a cross-correlation of the time domain, phase-coded radar return pulse and fifth signal to effect substantially the time domain signal of the desired range correlation response of the phase-coded radar return pulse.

6. The pulse compression signal processor in accordance with claim 5 wherein the other transforming means comprises an inverse fat fourier transform (FFT) signal processor.

7. The pulse compression signal processor in accordance with claim 1 including:

means for truncating the length of time of the fourth signal, thereby effecting a truncated desired filter function signal;

means for phase decoding the first signal as a function of said truncated fourth signal to effect a range correlation response of said first signal;

means for providing said truncated fourth signal to said second filtering means if said range correlation response of said first signal satisfies pre-established criteria; and means for causing the range correlation response of said first signal to satisfy said pre-established criteria by adjusting the truncation of the fourth signal.

8. The pulse compression signal processor in accordance with claim 7 wherein the second filter means includes means for performing a cross-correlation of the time domain, phase-coded radar return pulse and truncated fourth signal to effect substantially the time domain signal representative of an alternative to the desired range correlation response of the phase-coded radar return pulse.

9. The pulse compression signal processor in accordance with claim 1 including:

means for truncating the length of time of the fourth signal, thereby effecting a truncated desired filter function signal;

means for phase decoding the first signal as a function of said truncated fourth signal to effect a range correlation response of said first signal;

means for providing said truncated fourth signal to said second filtering means if said range correlation response of said first signal satisfies pre-established criteria; and means for causing the range correlation response of said first signal to satisfy said pre-established criteria by altering the modification of the second signal into a third signal representative of an alternative to the desired range correlation response.

10. The pulse compression signal processor in accordance with claim 9 wherein the second filter means includes means for performing a cross-correlation of the time domain, phase-coded radar return pulse and truncated fourth signal to effect substantially the time domain signal representative of the alternative to the desired range correlation response of the phase-coded radar return pulse.

* * * * *